US011513981B2

(12) United States Patent
McDaniel et al.

(10) Patent No.: US 11,513,981 B2
(45) Date of Patent: Nov. 29, 2022

(54) PCIE LINK MANAGEMENT WITHOUT SIDEBAND SIGNALS

(71) Applicant: DELL PRODUCTS L.P., Round Rock, TX (US)

(72) Inventors: Ryan Cartland McDaniel, Hopkinton, MA (US); Jim H. Street, Grafton, MA (US); John Victor Burroughs, East Sandwich, MA (US); James C. Tryhubczak, Cumberland, RI (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/861,707

(22) Filed: Apr. 29, 2020

(65) Prior Publication Data

US 2021/0342280 A1    Nov. 4, 2021

(51) Int. Cl.
*G06F 13/20* (2006.01)
*G06F 13/40* (2006.01)
*G06F 13/42* (2006.01)

(52) U.S. Cl.
CPC .......... *G06F 13/20* (2013.01); *G06F 13/4022* (2013.01); *G06F 13/4282* (2013.01); *G06F 2213/0026* (2013.01)

(58) Field of Classification Search
CPC .. G06F 13/20; G06F 13/4022; G06F 13/4282; G06F 2213/0026
See application file for complete search history.

(56) References Cited

U.S. PATENT DOCUMENTS

| | | | |
|---|---|---|---|
| 7,424,566 B2 | 9/2008 | Manula et al. | |
| 8,098,993 B2 | 1/2012 | Kirkpatrick et al. | |
| 8,117,350 B2 | 2/2012 | Watkins et al. | |
| 9,054,806 B2 | 6/2015 | Zbinden et al. | |
| 9,501,438 B2 | 11/2016 | Takumitsu | |
| 9,697,156 B2 | 7/2017 | Arroyo et al. | |
| 9,870,336 B2 | 1/2018 | Buckland et al. | |
| 2006/0085586 A1* | 4/2006 | Birmiwal | G06F 13/4027 710/306 |
| 2011/0179314 A1* | 7/2011 | Patel | G06F 11/0721 714/48 |
| 2012/0191887 A1 | 7/2012 | Yamauchi et al. | |
| 2013/0159585 A1* | 6/2013 | Ogawa | G06F 13/385 710/305 |

(Continued)

FOREIGN PATENT DOCUMENTS

| | | |
|---|---|---|
| CN | 109164884 A | 1/2019 |
| CN | 208813082 U | 5/2019 |

*Primary Examiner* — Henry Tsai
*Assistant Examiner* — Harry Z Wang
(74) *Attorney, Agent, or Firm* — Jackson Walker LLP; Christopher J. Rourk (57) ABSTRACT

A system for controlling data communications, comprising an enclosure management processor configured to generate a peripheral component interconnect express reset command and a chip reset command. A re-timer configured to receive the peripheral component interconnect express reset command and the chip reset command and to control a communications port in response to the peripheral component interconnect express reset command and the chip reset command. The communications port configured to reset in response to a control signal from the re-timer.

20 Claims, 3 Drawing Sheets

(56) References Cited

U.S. PATENT DOCUMENTS

| | | | |
|---|---|---|---|
| 2014/0068130 A1* | 3/2014 | Matsuura | G06F 13/4068 710/305 |
| 2014/0112339 A1* | 4/2014 | Safranek | G06F 13/4286 370/389 |
| 2016/0306722 A1* | 10/2016 | Zou | G06F 11/3027 |
| 2019/0073148 A1* | 3/2019 | Adrian | G06F 3/0613 |

* cited by examiner

PCIE LINK MANAGEMENT WITHOUT SIDEBAND SIGNALS

TECHNICAL FIELD

The present disclosure relates generally to data communications, and more specifically to a system and method for peripheral component interconnect express (PCIe) link management that does not require sideband signals.

BACKGROUND OF THE INVENTION

Data communications systems, such as the PCIe system, can suffer from numerous different conditions that prevent the system from functioning properly. A system reset is typically used to correct these issues, such as by turning the power to the processor that controls the system off and then back on.

SUMMARY OF THE INVENTION

A system for controlling data communications is disclosed that includes an enclosure management processor that is configured to generate a peripheral component interconnect express reset command and a chip reset command. A re-timer is configured to receive the peripheral component interconnect express reset command and the chip reset command and to control a communications port in response to the peripheral component interconnect express reset command and the chip reset command. The communications port is configured to reset in response to a control signal from the re-timer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Peripheral component interconnect (PCI) and PCIe buses were developed to be used on boards and add-in cards contained within a computer. The extension of this bus outside of the chassis to support distributed architectures, chassis to chassis interconnects and disk array connections has created new challenges associated with link integrity and management. For example, standard mini-Serial Attached SCSI (SAS) HD cables can be used to interconnect PCIe buses between chassis. Each cable can carry x4 PCIe links and multiple cables can be used to create x8 or x16 links. These standard cables do not carry the PCIe sideband signals, such as those used for the PCIe reference clock (Refclk) or PCIe reset. While an in-band 'hot reset' can be used to reset a link, a complex topology that could include multiple re-timers and switches can end up in a state where the link is down. When the link is down, an in-band hot reset cannot be issued to recover the link. Furthermore, in the chassis-to-chassis connection configuration, the root complex is not part of the same enclosure management domain, so there is no traditional method for recovering the link via power cycling or system resets.

The present disclosure provides for an autonomous method of recovering a PCIe link between devices in different enclosure management domains, such as when the link is stuck in a non-functional state and when a sideband PCIe reset or other control signal or bus from the host is not present. In one example embodiment, the local enclosure management processor can be used to poll registers of the various devices on the link, such as re-timers, to look for a signature of a stuck link. If the enclosure manager identifies a stuck link, it can act locally to either issue a port reset, a PCIe Reset to its local devices, a chip reset or power cycle to force a retraining of the link and recover from the stuck bus condition, or other suitable functions can also or alternatively be implemented.

In another example, a server and a disk array enclosure (DAE) can be provided. The DAE can be connected to the server via a 4-lane PCIe link running over a standard Mini-SAS HD cable. A PCIe re-timer can be used on each board to overcome the channel loss added by running PCIe over long distances of trace and cable. The DAE can use a fanout PCIe switch to connect multiple drives to the host through the 4-lane link.

Each enclosure can have a management processor that is responsible for control and monitoring of the local enclosure. The management processor can have connectivity to the various devices on the board through discrete signals, such as port resets, chip resets and PCIe resets, as well as through bus interfaces, such as a Two Wire Interface (TWI) bus or other suitable systems or components.

The PCIe bus has specific startup and enumeration timing requirements, and creating the disclosed topology between separate enclosures, which can be operating on different power and reset domains, can lead to cases where enumeration fails and results in one or more of the re-timers or switches getting into a state where the link is down. The present disclosure uses the enclosure management processor or other suitable devices or systems to poll the devices through the TWI bus, to look for the signature of a stuck condition and to initiate corrective action.

In another example embodiment that is based on the hardware configuration described above, the signature of a stuck state on the re-timer or switch could be a "no link"

condition, where the switch is not in a detect, polling or configuration state. The PCIe switch can have an additional failing mode if the link width is greater than zero and the link training and status state machine (LTSSM) state is not in the "Link Active" state.

To further ensure that a recovery action is only taken when absolutely necessary, the polling rate can be set to a relatively slow time period, such as approximately 3 seconds, or other suitable periods. Setting a slow polling rate provides an additional benefit of not overtaxing the limited resources of the enclosure management processor. Furthermore, the present disclosure can provide that no action is taken until the signature is repeated and persistent across more than one polling cycle. These functions eliminate the possibility that the polling could line up with a normal transient state that could be present during enumeration, such as a hot reset. In this example embodiment, the signature would need to be present through 5 consecutive cycles before recovery is implemented, but other suitable numbers of cycles can also or alternatively be used. When combined with a suitable polling time, such as approximately 3 seconds, this configuration would create a 15 second window, which is typically long enough to allow for normal transitions through these states that can occur during link bring-up and initialization, without causing the enclosure management processor to take action.

Upon detecting the signature of a stuck state for more than a predetermined number of polling cycles, the enclosure manager for the device that is stuck can autonomously act to reset that device and other devices on the link. This reset action can fix the stuck bus by clearing the state machines in the devices used for bringing a link up and allow the host to attempt to bring the link up again. The disclosed autonomous method does not require any communication between the enclosure management processors on the two different chassis, and no extra external connections is required between the boxes.

Custom PCIe cables can be used in lieu of the present disclosure that accommodate an added sideband PCIe reset signal between enclosures. However, the added cost of custom cables and the additional cost and complexity to have new cables with new part numbers, which would no longer be interchangeable with SAS cables, makes such alternatives undesirable.

The present disclosure thus provides a method for recovering stuck PCIe busses when a host sideband reset does not propagate to all downstream devices. A signature can be used for a stuck PCIe bus that a processor can use to determine when to act to recover the bus. The present disclosure also provides for using an enclosure management processor to autonomously reset devices on a PCIe bus to recover the link.

Figure 1:
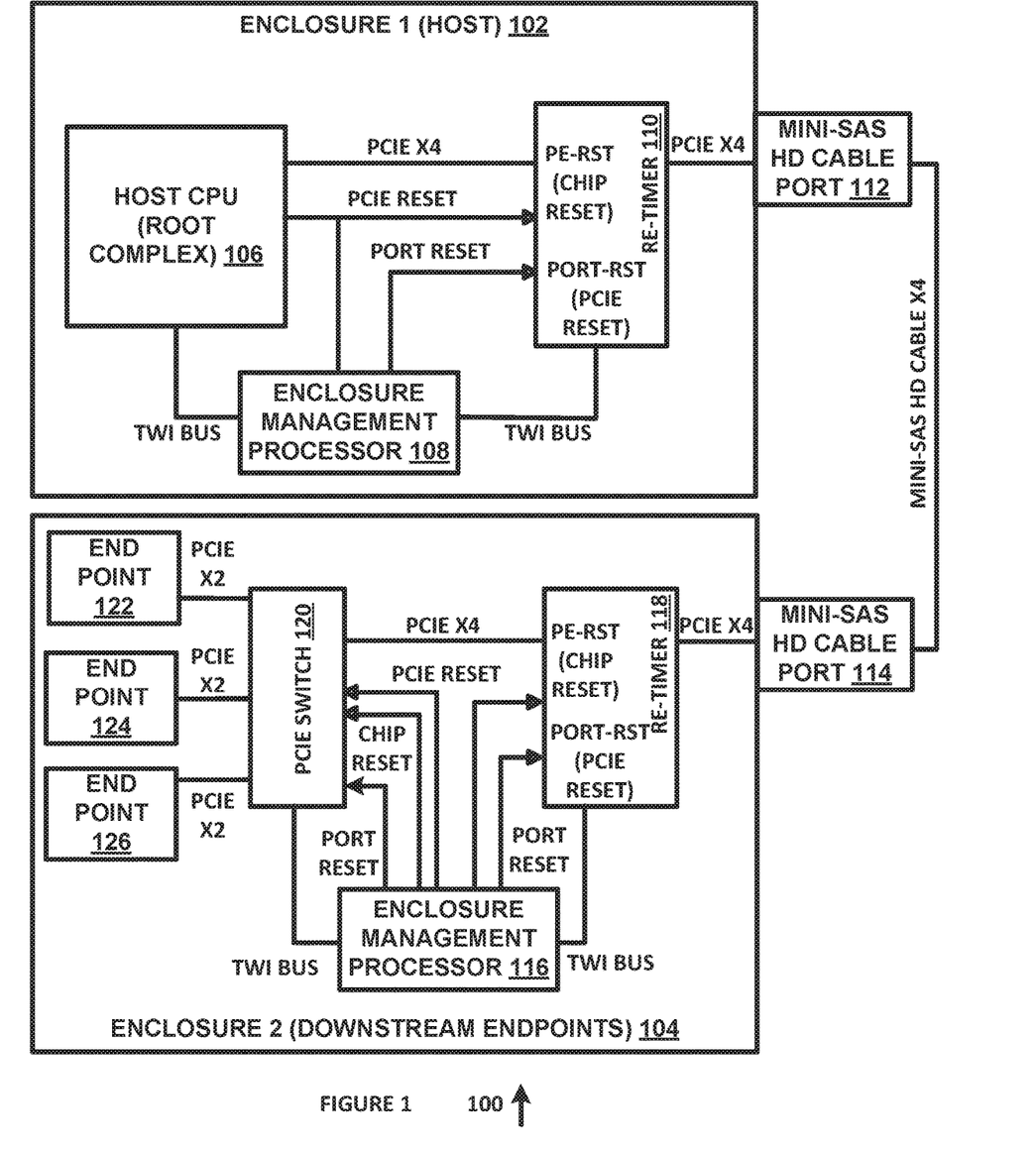
FIG. 1 is a diagram of a system for providing PCIe link management without sideband signals, in accordance with an example embodiment of the present disclosure.

FIG. 1 is a diagram of a system 100 for providing PCIe link management without sideband signals, in accordance with an example embodiment of the present disclosure. System 100 includes enclosure 1 (host) 102, enclosure 2 (downstream endpoints) 104, host CPU (root complex) 106, enclosure management processor 108 and 116, re-timers 110 and 118, mini-SAS HD cable ports 112 and 114, PCIE switch 120 and end points 122, 124 and 126, each of which can be implemented in hardware or a suitable combination of hardware and software.

Enclosure 1 (host) 102 can be a disk array server or other suitable systems. In one example embodiment, enclosure 1 102 can be a host server blade in a server rack that is used to control an array of data storage devices in another server blade.

Enclosure 2 (downstream endpoints) 104 can be a disk array or other suitable devices. In one example embodiment, enclosure 2 (downstream endpoints) 104 can be a data storage device blade in a server rack that contains an array of data storage devices.

Host CPU (root complex) 106 can include one or more algorithms that are installed onto a processor and which perform system management functions and other related functions for enclosure 1 (host) 102. In one example embodiment, host CPU (root complex) 106 can have limited direct control functionality over mini-SAS HD cable port 112, and direct control of mini-SAS HD cable port 112 may need to be implemented by enclosure management processor 108 and re-timer 110. In another example embodiment, the host CPU (root complex) might not have direct control of re-timer 110, and can share control of re-timer 110 with enclosure management processor 108. In this example embodiment, the PCIE reset to re-timer 110 can be asserted by either host CPU (root complex) 106 or enclosure management processor 108, and the PCIE reset can be used to assert a chip reset of re-timer 110.

In this regard, re-timer 110 can be provided with a pe-rst (PCIE reset) pin that is used to control re-timer 110 chip reset, as activation of this input affects the entire re-timer 110 (all lanes, which can be 16 lanes wide or other suitable widths). Re-timer 110 port-rst (port reset) pins (which may have up to 4 per configuration) can be used to control re-timer 110 PCIE reset on a port-by-port basis.

As shown in the diagram the PCIE x4 connection between host CPU (root complex) 106 and re-timer 110 can be controlled by one pin, and three other pins may be provided for three additional ports that can each accept a PCIE x4 connection. Enclosure management processor 108 could generate a PCIE reset signal to the pe-rst pin, but that signal would affect multiple ports. In contrast, enclosure management processor 108 observes each port, and will typically not interrupt a working link.

In another embodiment, re-timer 110 can be configured to support 2×8 ports, where each ×8 port connects to a 2×4 miniSAS port. Enclosure management processor 108 can generate one or more control signals in response to an algorithmic process operating on enclosure management processor 108 to cause host CPU (root complex) 106 to direct resets for enclosure 1 (host) 102.

For enclosure 2 (downstream endpoints) 104, enclosure management processor 116 will typically not generate a PCIE reset input to a pe-rst (chip reset) re-timer 118, unless a port reset (PCIE reset) has failed.

When a chip reset is discussed herein, it should be assumed that it is a reset type that is to be avoided except as a last resort. Instead, the port reset can be used as the main remedy, as shown by algorithm 400 in FIG. 4 below, which only shows a port reset being used. In the embodiment of algorithm 400, a chip reset can be used as part of initialization, where the loop starting at A relates to the port reset.

Enclosure management processor 108 and 116 can each include one or more algorithms that are installed onto a processor and which perform control and monitoring of the systems and components contained in the associated local enclosure. Each enclosure management processor 108 and 116 can have connectivity to the systems and devices on the boards contained within the enclosure or to other systems and components in the enclosure through discrete signals, such as port reset signals, chip reset signals and PCIe reset signals, as well as through bus interfaces, such as a TWI bus or other suitable systems or components. Each enclosure management processor 108 and 116 can poll the systems and devices that it is associated with through the TWI bus or in other manners, such as to look for the signature of a stuck condition and to initiate corrective action, or for other suitable purposes.

Re-timers 110 and 118 can include one or more integrated circuits, one or more algorithms that are installed onto a processor, or other suitable systems and/or components that can be utilized overcome the channel loss added by running PCIe over long distances of trace and cable. In one example embodiment, re-timers 110 and 118 can receive and respond to a port reset control and/or a PCIe reset control that are received from enclosure management processor 108 and 116, respectively, such as by implementing a port reset, a PCIe reset or other suitable actions.

Mini-SAS HD cable ports 112 and 114 can include one or more integrated circuits, one or more algorithms that are installed onto a processor, or other suitable systems and/or components that can be utilized to control PCIe communications over a suitable communications medium. In one example embodiment, mini-SAS HD cable ports 112 and 114 can each control transmission and reception of an x4 PCIe link over a single HD cable, or other suitable data communications.

PCIE switch 120 can receive PCIe format data over a connection to re-timer 118, such as over an x4 PCIe connector or other suitable media. PCIE switch 120 can provide the received data to one or more of end points 122, 124 and 126 over a suitable communications medium, such as an x2 PCIe connector or other suitable media. PCIE switch 120 can receive and respond to a chip reset control, port reset and/or a PCIe reset control that are received from enclosure management processor 116, such as by implementing a reset, a PCIe reset or other suitable functions.

In operation, system 100 can be used to control and recover a PCIe link between enclosure 1 (host) 102 and enclosure (downstream endpoints) 104. System 100 avoids a stuck link configuration that can even be resistant to correction by power cycling only a single device, by allowing enclosure management processor 108 and 116 to provide port reset, chip reset and PCIe reset commands to re-timers 110 and 118, respectively, by allowing enclosure management processor 116 to provide port reset, chip reset and PCIe reset commands to PCIe switch 120, and in other suitable manners.

Figure 2:
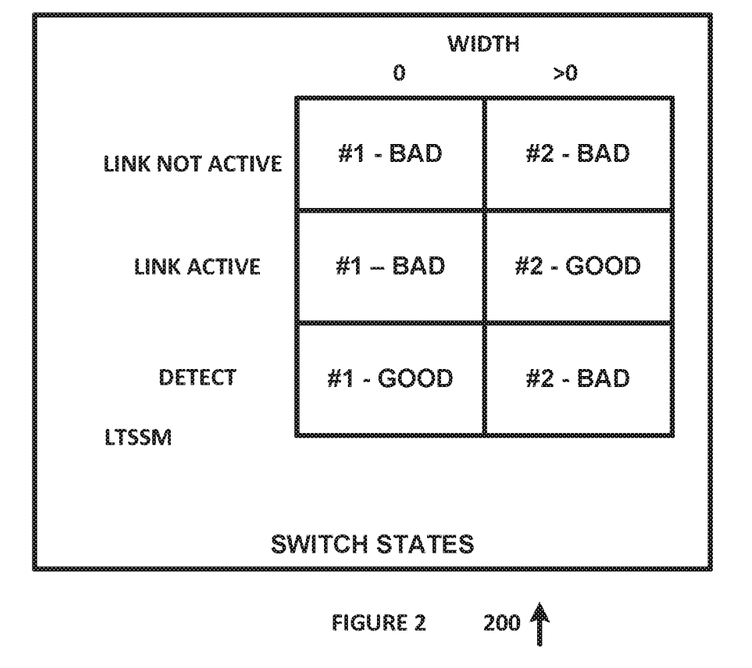
FIG. 2 is a diagram of switch states, in accordance with an example embodiment of the present disclosure.

FIG. 2 is a diagram 200 of switch states of a state machine, in accordance with an example embodiment of the present disclosure. The state machine can be implemented using one or more algorithms operating on a processor, using one or more logic devices or in other suitable manners.

Switch states in diagram 200 include LTSSM states for "link not active," "link active" and "detect," with associated link width states of "0" and "greater than 0." As can be seen, the good switch states include a "detect" state with a link width of "0" and a "link active" state with a link width state of "greater than 0," and the bad switch states include a "detect" state with a link width of "greater than 0," a "link active" state with a link width state of "0," and any link not active state, regardless of the link width state. When the switch states are detected to be in a bad state, the reset operation can be initiated.

Figure 3:
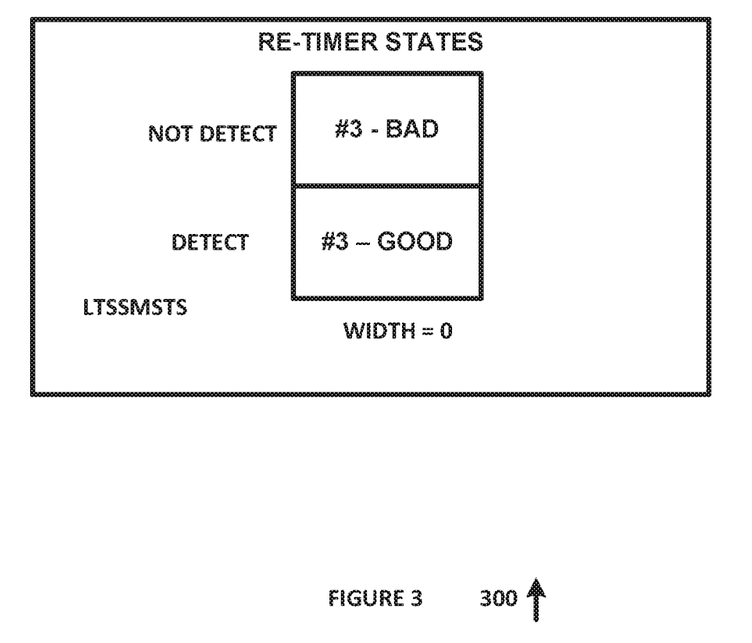
FIG. 3 is a diagram of re-timer states, in accordance with an example embodiment of the present disclosure.

FIG. 3 is a diagram 300 of re-timer states of a state machine, in accordance with an example embodiment of the present disclosure. The state machine can be implemented using one or more algorithms operating on a processor, using one or more logic devices or in other suitable manners.

Re-timer states in diagram 300 include LTSSM timer states (LTSSMTS) for "not detect" and "detect," with associated link width states of "0." As can be seen, the good re-timer state includes a "detect" state with a link width of "0," and the bad re-timer state includes a "detect" state with a width of "0." When the re-timer state is detected to be in a bad state, the reset operation can be initiated.

Figure 4:
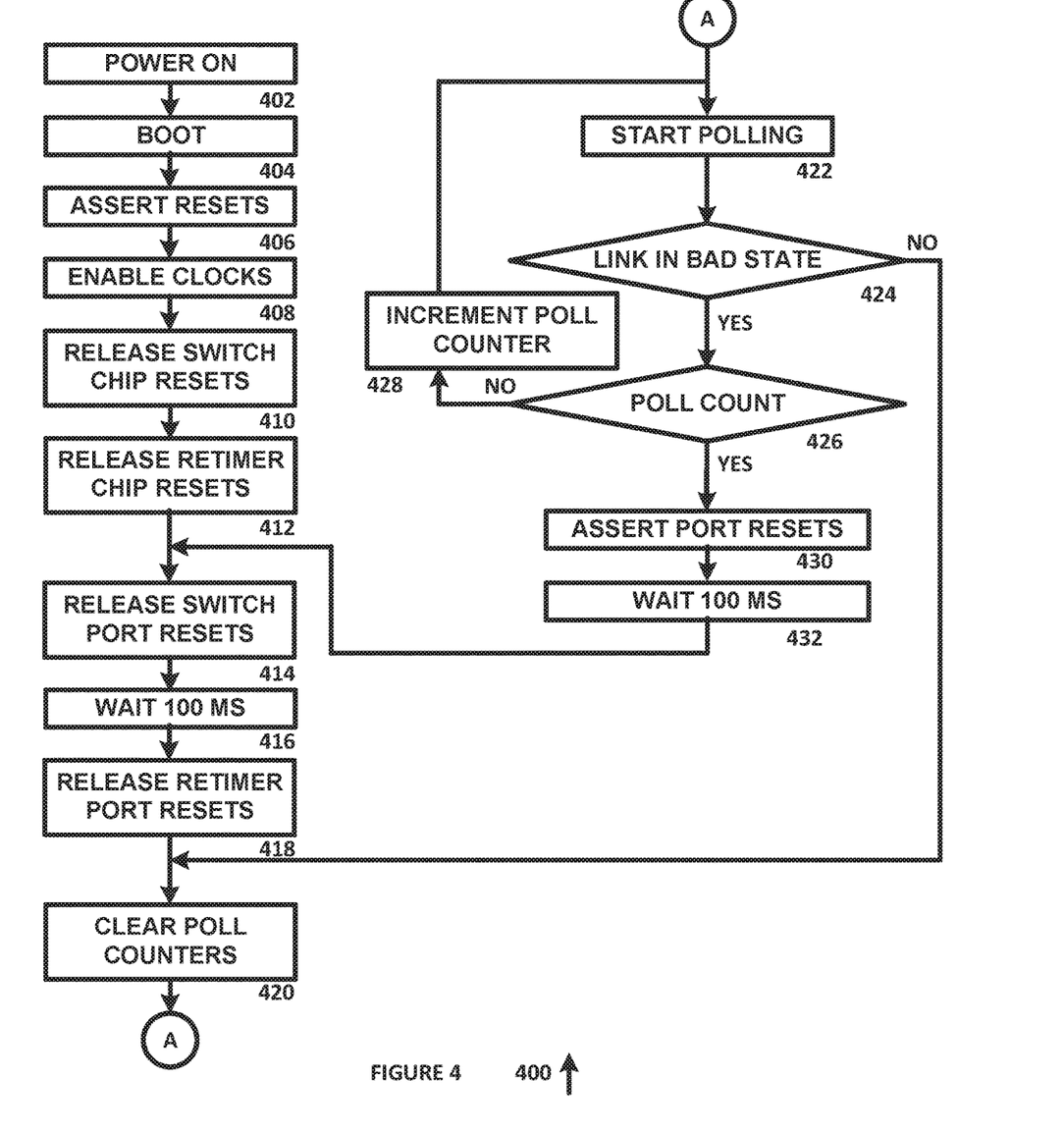
FIG. 4 is a flow chart of an algorithm for providing PCIe link management without sideband signals, in accordance with an example embodiment of the present disclosure.

FIG. 4 is a flow chart of an algorithm 400 for providing PCIe link management without sideband signals, in accordance with an example embodiment of the present disclosure. Algorithm 400 can be implemented on one or more processors of one or more devices or systems or in other suitable manners.

Algorithm 400 begins at 402, where power is turned on. In one example embodiment, the power can be turned on manually, by a remote access controller or in other suitable manners. The algorithm then proceeds to 404.

At 404, a system boot is initiated. In one example embodiment, a host CPU or other suitable system can initiate a system boot of components such as by transmitting controls over a system bus, a TWI bus or other suitable communications media to an enclosure management processor, a re-timer, a mini-SAS HD cable port, a PCIe switch, end point devices or other suitable devices or systems. The algorithm then proceeds to 406.

At 406, resets are asserted. In one example embodiment, one or more of a re-timer chip reset, a re-timer port reset, a PCIe chip switch reset and a PCIe switch port reset can be asserted by an enclosure management processor of a host, an enclosure management processor of a downstream endpoints system or other suitable systems or devices. The algorithm then proceeds to 408.

At 408, one or more clocks are enabled. In one example embodiment, the clocks can include a PCIe reference clock (Refclk) or other suitable clocks, which can be enabled using a clock enable signal from an enclosure management processor, a re-timer or other suitable systems or components. The algorithm then proceeds to 410.

At 410, switch chip resets are released. In one example embodiment, the switch chip resets can include a PCIe switch chip reset or other suitable switch chip resets, which can be enabled using a clock enable signal from an enclosure management processor, a re-timer or other suitable systems or components. The algorithm then proceeds to 412.

At 412, re-timer chip resets are released. In one example embodiment, the re-timer chip resets can be released using a reset signal from an enclosure management processor or other suitable systems or components. The algorithm then proceeds to 414.

At 414, switch port resets are released. In one example embodiment, the switch port resets can be released using a reset signal from an enclosure management processor or other suitable systems or components. The algorithm then proceeds to 416.

At 416, a wait time is implemented, such as 100 ms or other suitable times that are sufficient to avoid an improper reset but long enough to ensure that a reset is required and properly coordinated with other system components. In one example embodiment, the wait time can be implemented by an enclosure management processor or other suitable systems or components. The algorithm then proceeds to 418.

At 418, re-timer port resets are released. In one example embodiment, the re-timer port resets can be released using a reset signal from an enclosure management processor or other suitable systems or components. The algorithm then proceeds to 420.

At 420, poll counters are cleared. In one example embodiment, the poll counters can be implemented using an enclosure management processor, and the poll counters can be cleared using the enclosure management processor or other suitable systems or components that implement the poll counters or that control the systems or components that implement the poll counters. The algorithm then proceeds to 422.

At 422, polling is started at the poll counters. In one example embodiment, the poll counters can be implemented using an enclosure management processor or other suitable systems or components. The algorithm then proceeds to 424.

At 424, it is determined whether the link is in a bad state. In one example embodiment, the state machines of diagrams 200 and 300 can be used to determine a link state, or other suitable state machines, systems, components or processes can also or alternatively be used to determine link state. If it is determined that the link is in a bad state, the algorithm proceeds to 426, otherwise the algorithm returns to 420.

At 426, it is determined whether the poll count has been exceeded. If the poll count has not been exceeded, the algorithm proceeds to 428, otherwise the algorithm proceeds to 430.

At 428, the poll counter is incremented. In one example embodiment, the poll counters can be implemented using an enclosure management processor, and the poll counters can be incremented using the enclosure management processor or other suitable systems or components that increment the poll counters or that control the systems or components that increment the poll counters. The algorithm then returns to 422.

At 430, resets are asserted. In one example embodiment, timer port resets, switch port resets and other suitable resets can be asserted by an enclosure management processor or other suitable systems or components. The algorithm then proceeds to 432.

At 432, a wait time is implemented, such as 100 ms or other suitable times that are sufficient to avoid an improper reset but long enough to ensure that a reset is required. In one example embodiment, the wait time can be implemented by an enclosure management processor or other suitable systems or components. The algorithm then returns to 414. Alternatively, if chip resets were used, the algorithm can return to 410 (not explicitly shown).

Although algorithm 400 is shown as a flow chart, one of ordinary skill in the art will recognize that it can be implemented using object-oriented programming, state diagrams, ladder diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling data communications, comprising:
    an enclosure management processor configured to generate a port reset command, a peripheral component interconnect express reset command and a chip reset command;
    a re-timer coupled to the enclosure management processor by a two wire interface bus and a separate port reset pin connection and configured to receive the peripheral component interconnect express reset command and the chip reset command and to control a communications port in response to the peripheral component interconnect express reset command and the chip reset command; and
    the communications port configured to reset in response to a control signal from the re-timer, wherein the enclosure management processor further comprises a switch state machine for a plurality of switch states, wherein the switch state machine receives link status data and generates the port reset command in response to a link status of no link, the peripheral component interconnect express reset command and the chip reset command as a function of the switch state machine output.

2. The system of claim 1 wherein the enclosure management processor further comprises a re-timer state machine for a plurality of re-timer states, wherein the re-timer state machine receives link status data and generates the peripheral component interconnect express reset command in response to a link status of no link and the chip reset command as a function of the re-timer state machine output.

3. The system of claim 1 wherein the communications port is configured to reset in response to a port reset signal and further comprising a chip reset pin coupled to a host CPU.

4. The system of claim 1 further comprising a second enclosure management processor coupled to a mini-serial attached SCSI HD cable port and a plurality of endpoints coupled to a switch and configured to generate a downstream peripheral component interconnect express reset command and a downstream chip reset command to perform communications with the plurality of endpoints.

5. The system of claim 1 further comprising a second re-timer configured to receive a second peripheral component interconnect express reset command and a second chip reset command and to control a second communications port in response to the second peripheral component interconnect express reset command and the second chip reset command.

6. The system of claim 1 further comprising a second communications port configured to reset in response to a control signal from a second re-timer.

7. The system of claim 1 wherein the switch state machine comprises a plurality states for a first link width including a width of zero and a width of greater than zero a plurality of states for a second link width including a width of zero and a width of greater than zero.

8. The system of claim 1 wherein the switch state machine comprises a plurality states for a first link width of zero state and a plurality of states for a second link width of at least one lane to at least 16 lanes.

9. The system of claim 1 wherein the switch state machine comprises a detect state for a first link width a detect state and for a second link width that is different from the first link width.

10. A system for controlling data communications, comprising:
    an enclosure management processor configured to generate a port reset command, a peripheral component interconnect express reset command and a chip reset command;
    a re-timer coupled to the enclosure management processor by a two wire interface bus and a separate port reset pin connection and configured to receive the peripheral component interconnect express reset command and the chip reset command and to control a communications port in response to the peripheral component interconnect express reset command and the chip reset command; and
    the communications port configured to reset in response to a control signal from the re-timer, wherein the enclosure management processor further comprises a re-timer state machine for a plurality of re-timer states, wherein the re-timer state machine receives link status data and generates the peripheral component interconnect express reset command in response to a link status of no link and the chip reset command as a function of the re-timer state machine output.

11. The system of claim 10 wherein the communications port is configured to reset in response to a port reset signal and further comprising a chip reset pin coupled to a host CPU.

12. The system of claim 10 further comprising a second enclosure management processor coupled to a mini-serial attached SCSI HD cable port and a plurality of endpoints coupled to a switch and configured to generate a downstream peripheral component interconnect express reset command and a downstream chip reset command to facilitate communications with the plurality of endpoints.

13. The system of claim 10 further comprising a second re-timer configured to receive a second peripheral component interconnect express reset command and a second chip reset command and to control a second communications port in response to the second peripheral component interconnect express reset command and the second chip reset command.

14. The system of claim 10 further comprising a second communications port configured to reset in response to a control signal from a second re-timer, and the re-timer comprises a chip reset pin coupled to the enclosure management processor by the two wire interface bus.

15. The system of claim 10 wherein the switch state machine comprises a plurality states for a first link width including a width of zero and a width of greater than zero a plurality of states for a second link width including a width of zero and a width of greater than zero.

16. The system of claim 10 wherein the switch state machine comprises a plurality states for a first link width of zero state and a plurality of states for a second link width of at least one lane to at least 16 lanes.

17. The system of claim 10 wherein the switch state machine comprises a detect state for a first link width a detect state and for a second link width that is different from the first link width.

18. A system for controlling data communications, comprising:
an enclosure management processor configured to generate a port reset command, a peripheral component interconnect express reset command and a chip reset command;
a re-timer coupled to the enclosure management processor by a two wire interface bus and a separate port reset pin connection and configured to receive the peripheral component interconnect express reset command and the chip reset command and to control a communications port in response to the peripheral component interconnect express reset command and the chip reset command; and
the communications port configured to reset in response to a control signal from the re-timer, wherein the enclosure management processor further comprises a switch state machine for a plurality of switch states, wherein the switch state machine receives link status data and generates the port reset command in response to a link status of no link, the peripheral component interconnect express reset command and the chip reset command as a function of the switch state machine output, and wherein the enclosure management processor further comprises a re-timer state machine for a plurality of re-timer states, wherein the re-timer state machine receives link status data and generates the peripheral component interconnect express reset command in response to a link status of no link and the chip reset command as a function of the re-timer state machine output.

19. The system of claim 18 wherein the communications port is configured to reset in response to a port reset signal and further comprising a chip reset pin coupled to a host CPU.

20. The system of claim 18 further comprising a second enclosure management processor coupled to a mini-serial attached SCSI HD cable port and a plurality of endpoints coupled to a switch and configured to generate a downstream peripheral component interconnect express reset command and a downstream chip reset command to facilitate communications with the plurality of endpoints.

* * * * *